United States Patent [19]

Naae et al.

[11] Patent Number: 5,095,985

[45] Date of Patent: Mar. 17, 1992

[54] ENHANCE OIL RECOVERY USING OIL SOLUBLE SULFONATE SURFACTANTS FROM LIGNIN AND ALKYLPHENOL

[75] Inventors: Douglas G. Naae; Centha A. Davis, both of Houston, Tex.

[73] Assignee: Texaco Inc., White Plains, N.Y.

[21] Appl. No.: 632,676

[22] Filed: Dec. 24, 1990

[51] Int. Cl.$^5$ .............................................. E21B 43/22
[52] U.S. Cl. .................................... 166/274; 166/275; 252/8.554
[58] Field of Search .................... 166/273, 274, 275; 252/8.554

[56] References Cited

U.S. PATENT DOCUMENTS

| | | | |
|---|---|---|---|
| 4,307,782 | 12/1981 | Schievelbein | 166/274 X |
| 4,438,002 | 3/1984 | Schievelbein | 166/275 X |
| 4,548,721 | 10/1985 | DeBons et al. | 166/275 X |
| 4,611,659 | 9/1986 | DeBons et al. | 166/275 X |
| 4,739,041 | 4/1988 | Morrow et al. | 166/275 X |
| 4,756,370 | 7/1988 | DeBons | 166/273 |
| 4,781,251 | 11/1988 | Naae et al. | 252/8.554 X |
| 4,787,454 | 11/1988 | Naae et al. | 166/274 |

*Primary Examiner*—George A. Suchfield
*Attorney, Agent, or Firm*—Jack H. Park; Kenneth R. Priem; Harold J. Delhommer

[57] ABSTRACT

The invention is a method of producing oil soluble surfactants from lignin which comprises reacting an alkylphenol having an alkyl chain of about 5 to about 20 carbon atoms with formaldehyde at elevated temperature to produce an intermediate product and reacting the intermediate product at an elevated temperature with a lignin phenol sulfonate to produce an oil soluble lignin surfactant, said lignin phenol sulfonate produced by placing lignin in contact with water, converting the lignin into low molecular weight lignin phenol by reducing the lignin in the presence of a reducing agent of carbon monoxide or hydrogen which creates a reduction reaction mixture comprising oil soluble lignin phenol, said reduction occurring at a temperature greater than about 200° C. and a pressure greater than about 100 psi, recovering the oil soluble lignin phenol from the reduction mixture and sulfonating the lignin phenol to produce lignin phenol sulfonate.

10 Claims, No Drawings

ENHANCE OIL RECOVERY USING OIL SOLUBLE SULFONATE SURFACTANTS FROM LIGNIN AND ALKYLPHENOL

BACKGROUND OF THE INVENTION

This invention relates to a method of producing surfactants from lignin. More particularly, the invention discloses a process of sulfonating a lignin phenol and reacting the lignin phenol sulfonate with a reaction product of alkylphenol and formaldehyde. These compounds may be used in surfactant flooding to recover hydrocarbons from underground formations.

Surface active compounds or surfactants have become extremely important chemicals in our society. Numberless types of surfactants are used for a myriad of applications. To work effectively, most surfactants require water soluble and oil soluble characteristics. It is these mixed characteristics which enable surfactants to lower the surface tension between two disparate liquids.

One problem with many surfactants is their high cost of manufacture. Surfactants which are relatively cheap have an inherent advantage in the marketplace.

A minor use of surfactants has been in surfactant flooding systems for enhanced oil recovery. But because of the relatively high cost of surfactants, surfactant flooding systems for oil recovery have generally not been economical.

Surfactant flooding to recover oil has been actively investigated due to the relatively poor ability of waterfloods to displace remaining oil from a reservoir's pore structure. Because of the reservoir structure and surface tensions involved, the floodwater may form channels or fingers, bypassing the oil in the formation.

Investigations of ways to increase oil recovery by improving the displacement ability of waterfloods have produced useful surfactants which reduce the interfacial tension between oil and water in the reservoir. With lower interfacial tensions, oil that is trapped in the pore structure can be dispersed into the water as smaller and more easily deformable droplets. Many types of surfactants have been investigated and the choice of which surfactant to employ in a waterflood operation is dependent upon reservoir characteristics as well as the cost and availability of the surfactants.

Lignin is a by-product that the pulping industry produces in prodigious amounts. As a result, a large research effort has been undertaken over the last 40 years in attempts to find uses for the large volume of lignin by-product.

Lignin is comprised of polymeric chains having molecular weights over 10,000 with multiple different units. One substantial monomeric unit contained in the lignin polymeric chains is propane phenol.

U.S. Pat. Nos. 4,739,041 and 4,790,382 describe a method of producing water soluble surfactants from lignin which comprises subjecting lignin to two reactions, alkylation and oxidation. U.S. Pat. Nos. 4,739,040 and 4,787,454 disclose a method of surfactant flooding with lignin surfactants produced by reducing lignin in the presence of a carbon monoxide or hydrogen reducing agent at high temperature and pressure to produce low molecular weight lignin phenols, and subjecting the lignin phenols to one or a combination of several reactions such as alkoxylation, alkylation, sulfonation, sulfation, alkoxysulfation, and sulfomethylation.

Another water soluble lignin surfactant variation is disclosed in U.S. Pat. No. 4,781,251 wherein an alkylphenol lignin surfactant is employed in a surfactant flooding system. The alkylphenol lignin surfactant is produced by reacting an alkylphenol having about 6 to about 15 carbon atoms in the alkyl chain with formaldehyde in basic solution at elevated temperature to form a first reaction product. The first reaction product is then reacted with a kraft lignin at elevated temperature to form an alkylphenol lignin reaction product. Finally, the alkylphenol lignin reaction product is made more water soluble by a reaction selected from the group consisting of sulfonation, sulfation, alkoxysulfonation, alkylsulfation and alkoxylation to produce the alkylphenol lignin surfactant.

A copending application Serial No. 632,836, filed Dec. 24, 1990, discloses the preparation of an oil soluble lignin surfactant by reacting benzyl alcohol with lignin phenol and sulfonating the reaction product. A second copending application Ser. No. 464,480, filed Jan. 12, 1990, teaches a method of making an oil soluble lignin surfactant by alkoxylating lignin phenol and subjecting the alkoxylated lignin phenol to a second reaction of sulfonation, sulfation or alkoxysulfation.

SUMMARY OF THE INVENTION

The invention is a method of producing oil soluble surfactants from lignin which comprises reacting an alkylphenol having an alkyl chain of about 5 to about 20 carbon atoms with formaldehyde at elevated temperature to produce a methylol alkylphenol, and reacting the methylol alkylphenol at an elevated temperature with a lignin phenol sulfonate to produce an oil soluble lignin surfactant.

The lignin phenol sulfonate is produced by placing lignin in contact with water, converting the lignin into low molecular weight lignin phenol by reducing the lignin in the presence of a reducing agent of carbon monoxide or hydrogen which creates a reduction reaction mixture comprising oil soluble lignin phenol, said reduction occurring at a temperature greater than about 200° C. and a pressure greater than about 100 psi, recovering the oil soluble lignin phenol from the reduction mixture and sulfonating the lignin phenol to produce lignin phenol sulfonate.

The invention also includes using these oil soluble surfactants in surfactant floods for enhanced oil recovery.

DETAILED DESCRIPTION

Because lignin is a high volume by-product of the pulping industry, it is a very cheap starting material. The use of these surfactants derived from lignin may reduce surfactant costs for enhanced oil recovery floods by as much as 40% to 60%.

The sulfonation of lignin phenol and subsequent reaction with the reaction product of an alkylphenol and formaldehyde forms a group of compounds having oil soluble surfactant properties. These compounds have at least two cyclic ring structures to which an alkyl chain, a sulfonate group, two hydroxy groups and a quite variable hydrocarbon group are attached. Some of the compounds may have more than two rings or other substituents. However, the group of products which results from this process are efficient surfactants.

The use of the term "lignin surfactant" herein refers to oil soluble surfactants derived from lignin according to the invention process. The term "lignin phenol" refers to the reduction product of lignin which is reduced in the presence of carbon monoxide or hydrogen at a temperature greater than about 200° C. and a pressure greater than about 100 psi.

The invention oil soluble lignin surfactants are used in a multistep process. First, an alkylphenol having an alkyl chain of about 5 to about 20 carbon atoms, preferably about 7 to about 12 carbon atoms, is reacted with formaldehyde at an elevated temperature, preferably in the presence of sodium hydroxide, to produce an intermediate product which may have a structure similar to methylol alkylphenol. Second, the intermediate product is reacted at elevated temperature with a lignin phenol sulfonate to produce an oil soluble lignin surfactant. The lignin phenol sulfonate is produced by placing lignin in contact with water and converting the lignin into low molecular weight lignin phenol by reducing the lignin in the presence of a reducing agent of carbon monoxide or hydrogen which creates a reduction reaction mixture comprising oil soluble lignin phenol. The reduction occurs at a temperature greater than about 200° C. and a pressure greater than about 100 psi. The lignin phenol is recovered from the reaction mixture and sulfonated to produce lignin phenol sulfonate.

The basic monomeric unit of lignin is propane phenol. The compound structures illustrated below indicate the basic structural changes undergone by lignin phenol sulfonate and alkylphenols reacted according to the invention. Please note that the structure of lignin and the lignin phenol derivative is complex and variable and not completely represented herein.

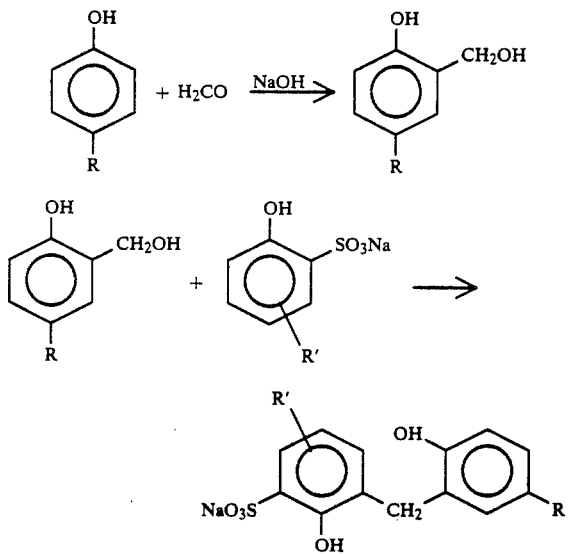

where R is an alkyl chain with 5 to 20 carbon atoms and R' is the remaining portion of the variable lignin phenol sulfonate molecule.

The lignin phenol sulfonate reactant is produced by a multi-step process from lignin. The lignin is first reduced at elevated temperature and pressure in the presence of carbon monoxide or hydrogen to yield a lignin phenol and then sulfonated.

The reductive degradation of lignin under these selected conditions produces a complex mixture of low molecular weight lignin phenols that are generally derived from or based on a propylphenol structure which has high solubility in organic solvents. Analysis of the lignin phenol reaction product indicates an average molecular weight of about 300 and a range of about 150 to about 1000, compared to a propylphenol molecular weight of 136 and lignin molecular weight of 3000 to 15,000. It is believed that the lignin phenol product is composed of 2, 3, 4, or more propane phenols linked or fused together plus assorted methoxyls, hydroxyls and other oxygens. Another major difference between the lignin phenol reduction product and lignin is that the reduction reaction decreases oxygen content by weight from about 25-30% to about 5-10%. Whenever the phrase "lignin phenol" is used herein, it refers to the above product mixture and not propylphenol or lignin.

The reduction reaction is carried out by placing a lignin in contact with water. The lignin may be dissolved or slurried in an aqueous medium at concentrations preferably ranging from about 5% to about 20% by weight. Sodium hydroxide or a similar compound may also be placed in the aqueous medium in a concentration of about 1% to about 15% by weight to increase lignin solubility. The reducing agent is injected into the reaction vessel to blanket the reduction reaction mixture at an initial pressure greater than about 100 psi, preferably greater than about 500 psi. The reducing gas is preferably carbon monoxide or hydrogen or a mixture of both.

A pasting oil can be used as the solvent for the lignin reduction reaction. This embodiment does away with the need for a later separation step from water in some cases before proceeding with the final reactions. But it is still necessary to contact the lignin with a relatively small amount of water for an effective reduction to take place.

A catalyst may be employed to increase the yield. A ferrous salt is the preferred catalyst for hydrogenation of lignosulfonate. Other metal ions which may be used to catalyze the lignosulfonate hydrogenation are: cobalt, molybdenum, nickel and aluminum. When it is desired to reduce kraft lignin, alkali lignin, or desulfonated lignosulfonate by hydrogenation, it is preferred to use about 1% to about 15% by weight of a Raney nickel catalyst, based on the weight of the kraft lignin.

In general, the hydrogen reduction reaction should be allowed to proceed at reaction temperature and pressure for a period of about 30 minutes to about 5 hours and the carbon monoxide reduction for a time period of about 15 minutes to about 2 hours. The oil soluble lignin phenols can then be extracted from the reduction reaction mixture with an organic solvent. Preferred solvents are ether, diethylether, tetrahydrofuran, benzene and toluene. The lignin phenols may then be ethoxylated and sulfated by means known in the art.

The reduction of lignin by hydrogen and carbon monoxide and their ethoxylation and sulfation is discussed in detail in U.S. Pat. No. 4,739,040, the disclosure of which is incorporated herein by reference.

The lignin phenols are converted to lignin phenol sulfonates by reactions known in the art. Further details as to these reactions with lignin phenols may be found in U.S. Pat. No. 4,739,040, previously incorporated by reference.

A preferred sulfonation method is to sulfomethylate the lignin phenol with formaldehyde and sodium sulfite or sodium bisulfite. The sulfomethylation reaction adds the sulfomethylene group ($-CH_2SO_3Na$) to the lignin phenol. Sulfuric acid, sulfur trioxide, or sulfur trioxide-dioxane complex may also be used to sulfonate the lignin phenol.

Previous tests have indicated that $SO_3$ stoichiometry is important. An excess of $SO_3$ may over-sulfonate the lignin phenol and give an eventual product with higher interfacial tension values.

Unlike U.S. Pat. No. 4,781,251 the invention process reacts an alkylphenol with a lignin phenol sulfonate instead of a non-sulfonated lignin. Second, the invention process requires that the lignin phenol be sulfonated prior to reaction with an alkylphenol. Tests with sulfonation after reaction of the lignin phenol and the alkylphenol produced a tarry polymer that did not have the desired properties. It is necessary to sulfonate the lignin phenol prior to reaction with the alkylphenol. It is believed that the sulfonate serves as a deactivating group on the ring, slowing down polymerization.

The present invention also differs from the invention surfactants disclosed in copending application Ser. No. 632,836, filed Dec. 24, 1990, in that the 10 copending application requires the sulfonation of the product only after the reaction of benzyl alcohol and lignin phenol. It should be noted again that the present invention requires that the lignin phenol be sulfonated prior to reaction with the alkylphenol/formaldehyde reaction product.

SURFACTANT FLOODING SYSTEMS

The invention also includes the injection of a surfactant flooding system into a reservoir to recover underground hydrocarbons, where the surfactant flooding system contains lignin surfactants produced by the above described process. Depending upon the surfactant formulation, some of these surfactants may be employed as sole surfactants, cosurfactants, or solubilizers in a surfactant flooding system. They may also be used to substitute for a certain percentage of an existing surfactant in a surfactant flooding system to lower the overall cost of the surfactants employed in the flooding system. Many of the lignin surfactants produced according to the above described process provide low interfacial tensions between oil and water, and form stable surfactant systems with many of the commercially available enhanced oil recovery surfactants now on the market.

It is well-known that conventional surfactant flooding mixtures are usually composed of one or more petroleum, petrochemical or synthetic sulfonates, a solubilizer or cosurfactant, brine and, optionally, a quantity of hydrocarbon. These components are normally combined to make a surfactant system.

The surfactant system is conventionally injected into a reservoir to form a front followed by the injection of additional brine or water which may contain a mobility control agent. The surfactant system is usually injected as a slug having about 10% to 20% of the pore volume of the reservoir with a total surfactant and solubilizer concentration of about 0.1% to about 10% by weight. A typical surfactant system may be:

1. one or more petroleum sulfonates such as
   (a) a water soluble sulfonate having a relatively low equivalent weight, or
   (b) an oil soluble sulfonate having a relatively high equivalent weight, or
   (c) any other commercially available petroleum sulfonates;
2. a solubilizer or cosurfactant;
3. brine; and
4. optionally, a light hydrocarbon.

As mentioned before, surfactant flooding systems can be formulated under some conditions without a solubilizer and with only a sole surfactant. Other components may be blended into the surfactant slug. Petrochemical and synthetic sulfonates may be substituted for petroleum sulfonates. The surfactant slug may also be preceded by a sacrificial agent, or contain viscosity improving polymers or a sacrificial agent.

Of course, not every combination of components will yield a stable and active surfactant system. Surfactant systems may be stable or unstable and have varying degrees of surfactant activity depending upon the specific lignin surfactants, other surfactants, solubilizer, and brine employed in a particular system. It is well-known in the art that each surfactant system must be tested. One cannot rely upon generalities as to stability or surfactant activity in multi-component surfactant systems.

The present invention resides in the use of about 0.1% to about 10% concentration by weight of lignin surfactants in any surfactant flooding system to recover underground hydrocarbons, wherein the lignin surfactants are prepared according to the described process. Additional surfactants other than the lignin surfactants may be included in the surfactant flooding systems.

Surfactant systems are generally pushed through the formation towards a production well by the subsequent injection of a drive fluid. The drive fluid is usually water, gas or water viscosified by a polymer. Hydrocarbons and other fluids are then recovered at one or more production wells.

The following examples will further illustrate the present invention which discloses a method for producing surfactants from lignin and employing such lignin surfactants in surfactant flooding systems. These examples are given by way of illustration and not as limitations on the scope of the invention. Thus, it should be understood that reaction steps and amounts may be varied with a process still remaining within the scope of the invention.

EXAMPLES 1-5

The lignin surfactants of Examples 1 and 2 noted in Table 1 were prepared accord in to the invention process. Para-nonylphenol was refluxed with formaldehyde in a 50/50 isopropanol/water mixture for one hour to produce an intermediate product. This product was then reacted with a sulfonated lignin phenol in a Parr reactor for 3 hours at 120° C. The reaction mixture was extracted with ether to separate the unreacted nonylphenol from the partially water soluble product.

The lignin phenol sulfonate was prepared from a lignin phenol made by cooking Indulin AT with 1000 psi carbon monoxide at 410° C. Indulin AT is a trademarked purified pine kraft lignin product sold by Westvaco Corp. with a lignin content of 93%.

TABLE 1
YIELDS AND IFT DATA OF NONYLPHENOL/FORMALDEHYDE/LIGNIN PHENOL SULFONATE PRODUCTS

| Example | Nonyl-phenol, g | Lignin Phenol Sulfonate:Nonyl-phenol Ratio[1] | Product Yield Weight, g | Product Yield % | Nonylphenol In Product g | Nonylphenol In Product % | IFT[2], mdyne/cm Robinson | IFT[2], mdyne/cm Salem |
|---|---|---|---|---|---|---|---|---|
| 1 | 10 | 1:1 | 11.88 | 59 | 1.88 | 15.8 | 330 | 520 |
| 2 | 2.5 | 1:0.25 | 10.86 | 87 | 0.86 | 7.9 | 1240 | 2070 |
| 3[3] | — | — | 9.51 | 95 | — | — | 330 | 980 |
| 4[4] | — | — | 10.42 | 82 | — | — | 3240 | 3330 |
| 5[5] | — | — | — | — | — | — | 230 | 660 |

[1]Ratio of lignin phenol sulfonate (Ex. 5):nonylphenol in the nonylphenol/formaldehyde condensation adduct.
[2]One hour interfacial tensions (IFT) determined for 2% solutions in 100% Robinson, IL, Well Supply Water (34,400 ppm TDS) against the indicated crude oil. Robinson crude is a dead oil with an average API gravity of 33°. Salem crude is a dead oil with an average API gravity of 36°.
[3]Lignin phenol sulfonate cooked at 120° C. for 3 hours.
[4]Lignin phenol sulfonate cooked with formaldehyde for 1 hour at 100° C., then 3 hours at 120° C.
[5]Lignin phenol sulfonate, unmodified starting material - no cooking.

The data in Table 1 show how the lignin phenol sulfonate/nonylphenol ratio affects the interfacial tension (IFT) values of the product. The lowest IFT value corresponded to the largest amount of nonylphenol incorporated onto the product. In this instance, 1.88 g out of 10 g of nonylphenol was incorporated onto the 10 g of lignin phenol sulfonate. The Example 1 lignin surfactant had good IFT values in both Robinson and Salem crude oils.

Example 3 was a control reaction that was cooked at 120° C. in the absence of any nonylphenol and formaldehyde. This sample showed little change occurred in the IFT value when the nonylphenol/formaldehyde was left out of the reaction.

Example 4 was also a control reaction. This sample showed the reaction with formaldehyde alone substantially raised the IFT value of the product. When the nonylphenol/formaldehyde adduct was added to the reaction to produce the invention surfactants in Examples 1 and 2, substantially lower IFT values were obtained.

Many other variations and modifications may be made in the method described above by those skilled in the art without departing from the concepts of the present invention. Accordingly, it should be clearly understood that the concepts disclosed in the description are illustrative and are not intended as limitations on the scope of the invention.

What is claimed is:

1. A method of recovering hydrocarbons from an underground formation penetrated by at least one injection well and at least one production well, which comprises:

injecting into an underground formation through an injection well about 0.1 to about 0.6 pore volumes of an aqueous surfactant slug comprising about 0.1% to about 10% by weight of an oil soluble lignin surfactant, said oil soluble lignin surfactant produced by reacting an alkylphenol having an alkyl chain of about 5 to about 20 carbon atoms with formaldehyde at elevated temperature to produce an intermediate product;

reacting the intermediate product at elevated temperature with a lignin phenol sulfonate, said lignin phenol sulfonate produced by placing lignin in contact with water, converting the lignin into low molecular weight lignin phenol by reducing the lignin in the presence of a reducing agent of carbon monoxide or hydrogen which creates a reduction reaction mixture comprising oil soluble lignin phenol, said reduction occurring at a temperature greater than about 200° C. and a pressure greater than about 100 psig, recovering the oil soluble lignin phenol from the reduction mixture, and sulfonating the lignin phenol to produce lignin phenol sulfonates;

injecting into the formation through the injection well a drive fluid to push the surfactant slug towards the production well; and recovering hydrocarbons at the production well.

2. The method of claim 1, further comprising the use of a water soluble surfactant in the surfactant slug.

3. The method of claim 1, further comprising the use of a solubilizer in the surfactant slug.

4. The method of claim 1, wherein the drive fluid is an aqueous polymer solution.

5. The method of claim 1, wherein the alkylphenol has about 7 to about 12 carbon atoms in the alkyl chain.

6. The method of claim 1, wherein the alkylphenol is reacted with formaldehyde in the presence of sodium hydroxide.

7. The method of claim 1, wherein the lignin phenol is sulfonated with sulfuric acid, sulfur trioxide or sulfur trioxide/dioxane complex.

8. The method of claim 1, wherein the reducing agent of hydrogen or carbon monoxide blankets the reduction reaction mixture at an initial pressure greater than about 500 psig.

9. The method of claim 1, wherein the reduction reaction occurs at a temperature of about 300° C. to about 550° C.

10. A method of recovering hydrocarbons from an underground formation penetrated by at least one injection well and at least one production well, which comprises:

injecting into an underground formation through an injection well about 0.1 to abut 0.6 pore volumes of an aqueous surfactant slug comprising about 0.1% to about 10% by weight of an oil soluble lignin surfactant, said oil soluble lignin surfactant produced by reacting an alkylphenol having an alkyl chain of about 7 to about 12 carbon atoms with formaldehyde in the presence of sodium hydroxide at elevated temperature to produce an intermediate product;

reacting the intermediate product at elevated temperature with a lignin phenol sulfonate, said lignin phenol sulfonate produced by placing lignin in contact with water, converting the lignin into low molecular weight lignin phenol by reducing the lignin in the presence of a reducing agent of carbon monoxide or hydrogen which creates a reduction reaction mixture comprising oil soluble lignin phenol, said reduction occurring at a temperature between about 300° C. and about 550° C. and a pressure greater than about 500 psig, recovering the oil soluble lignin phenol from the reduction mixture, and sulfonating ht lignin phenol to produce lignin phenol sulfonates;

injecting into the formation through the injection well a drive fluid to push the surfactant slug towards the production well; and recovering hydrocarbons at the production well.

* * * * *